April 24, 1928.
E. C. HARRIS
VALVE
Filed Oct. 4, 1926
1,667,203
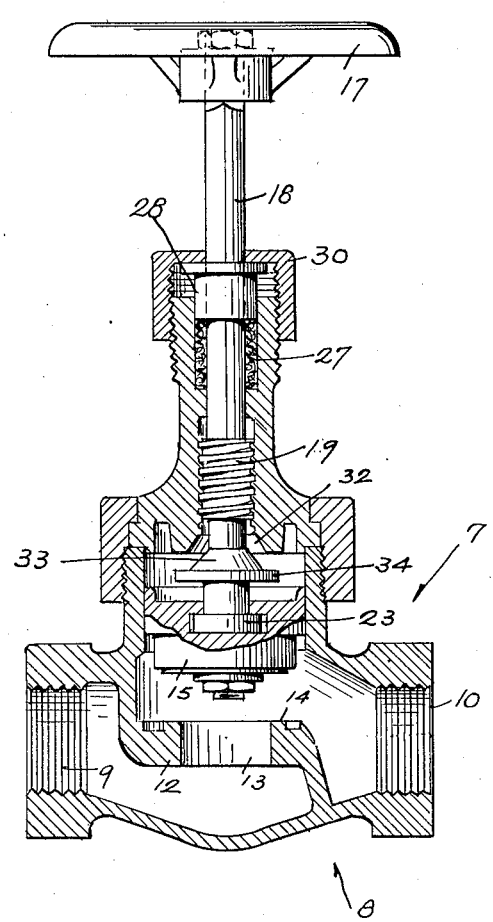
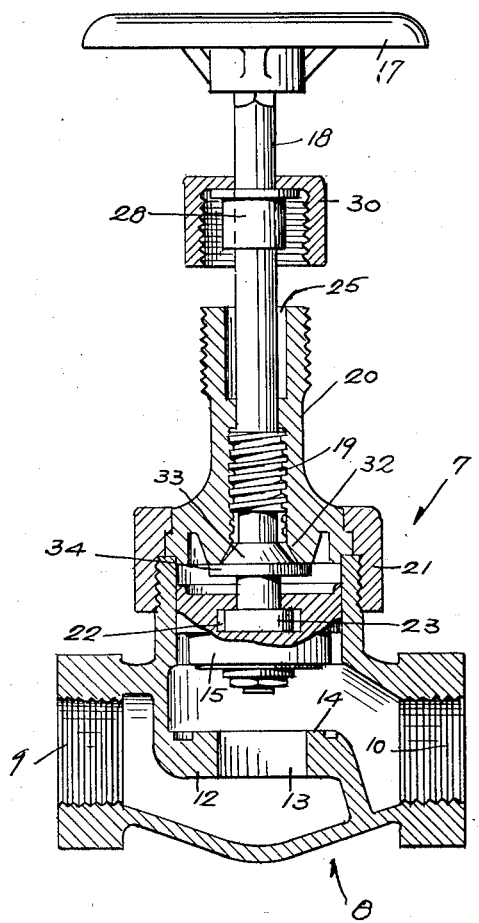
INVENTOR
ERNEST C. HARRIS
BY
ATTORNEY Patented Apr. 24, 1928.

1,667,203

UNITED STATES PATENT OFFICE.

ERNEST C. HARRIS, OF DENVER, COLORADO.

VALVE.

Application filed October 4, 1926. Serial No. 139,501.

This invention relates to valves and it has as one of its objects the provision of valve structure whereby packing employed therein may be removed without shutting off the valve.

With the foregoing object in view, together with such other objects and advantages as may subsequently appear, this invention resides in the construction and arrangement of parts hereinafter described and claimed, and illustrated in the accompanying drawings, in which:

Figure 1 is a view of the valve mostly in section and showing the passageway through the valve partly open; and Figure 2 is a view similar to Figure 1, showing the valve fully open and also showing the packing removed and the parts adjacent the stuffing box in open position for the renewal of the packing.

Referring to the drawings for a more detailed description thereof, the valve comprises a casing 7. The casing comprises a body portion 8 having an inlet and outlet 9 and 10 respectively between which is disposed a member 12 having an aperture 13 and providing on its upper surface a valve seat 14 for the reception of a valve 15 which is slidable in the body portion 8. The valve 15 may be seated and unseated by the turning of the wheel 17, which is mounted on a stem 18, threadedly engaging at 19 a tubular member 20 which is secured to the body 8 of the valve by means of a threaded member 2.

The valve 15 has an aperture 22 in its upper surface to receive an enlarged portion 23 of the lower end of the stem 18, and to receive also that part of the stem just above the valve 15. The stem 18 is rotatable in the aperture 22 so that the valve 15 does not rotate in its seating and unseating movements.

The upper portion of the tubular member 20 has a stuffing box 25, filled as shown in Figure 1 with stuffing 27, which is held in place by a follower 28, pressed on by a cap 30 which threadedly engages the member 20.

The lower end of the aperture through the member 20 is coned as at 32 to receive a coned portion 33 of a valve 34 which is adapted to be seated on or unseated from the lower interior end portion of the member 20 by the vertical movement of the stem 18 to which the valve is secured.

When it is desired to change the stuffing 27, the valve 15 is raised until the valve 34 is seated; there is then no danger of liquid leaking through the tubular member 20 when the cap 30 and follower 28 are removed from their normal positions to renew the stuffing.

While I have described one embodiment of my invention, modifications thereof may be readily devised without departing from the spirit of my invention, and it is to be understood that such modifications come within the scope of the appended claim.

I claim:

In a device of the character described, a pipe section having a partition with a diametrical perforation, a radial extension of the pipe arranged coaxially with the perforation, a cap on said extension, means for holding the cap in place, a valve stem threaded into the cap and having a valve revolvable on its lower end adapted to be seated on the rim of the perforation when the stem is threaded inwardly, a tapered annular rib extending from the cap and forming a valve seat, and a second valve fixed on the stem adapted to engage said seat when the stem is threaded outwardly, the second valve comprising a tapered section adapted to recede into the rib and a disc bearing on the rib.

ERNEST C. HARRIS.